United States Patent Office 3,734,880
Patented May 22, 1973

3,734,880
POLYURETHANE COMPOSITION AND METHOD
OF ITS PREPARATION
Anthony F. Finelli, Akron, Ohio, assignor to The
Goodyear Tire & Rubber Company, Akron, Ohio
No Drawing. Continuation-in-part of application Ser. No.
155,280, June 21, 1971, which is a continuation of application Ser. No. 688,668, Dec. 7, 1967. This application June 28, 1972, Ser. No. 266,871
Int. Cl. C08g 22/00
U.S. Cl. 260—37 N
9 Claims

ABSTRACT OF THE DISCLOSURE

A polyurethane composition resistant to phosphoric acid prepared by first forming a prepolymer by reacting is the presence of a 2,6-dialkylated para cresol a hydroxy-containing unsaturated polymeric polyol having a molecular weight of from about 1000 to about 5000 and a hydroxyl functionality of about 2.1 to about 2.8 and a liquid diphenyl methane diisocyanate followed by curing said prepolymer by reacting with an organic primary diamine.

---

This application is a continuation-in-part of application Ser. No. 155,280, filed June 21, 1971, now abandoned, which was a streamlined continuation of application Ser. No. 688,668, filed Dec. 7, 1967, now abandoned.

This invention relates to an improved polyurethane composition and to a method for its preparation.

Heretofore, polyester and polyether polyurethane compositions have degraded excessively when exposed to concentrated phosphoric acid and thus they could not be used for applications which required contact with phosphoric acid for extended periods of time, particularly at elevated temperatures.

Therefore, it is an object of this invention to provide a polyurethane composition which is resistant to phosphoric acid and to provide a method for its preparation.

In accordance with this invention it has been found unexpectedly that an improved polyurethane composition comprises a composition prepared by the method comprising (a) preparing a prepolymer having a free isocyanate content of from about 2 to about 8 percent by reacting in the presence of from about 1 to about 5 parts by weight of a 2,6 dialkylated para cresol having the formula

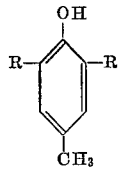

where R is an alkyl radical having from 4 to 12 carbon atoms; (1) 100 parts by weight of an hydroxyl containing polymeric polyol having a molecular weight of from about 1000 to about 5000, a corresponding hydroxyl number of from about 110 to about 20 and an hydroxyl functionality of from about 2 to about 3 and where the polymeric polyol comprises from about 70 to about 100 percent units derived from conjugated dienes selected from the group consisting of 1,3-butadiene and isoprene and up to about 30 percent units derived from styrene, and (2) a diphenyl methane diisocyanate, and (b) curing the said prepolymer by reacting the prepolymer with an organic diamine having primary amino groups in an amount of from about 0.5 to about 1.0 amino groups for each free isocyanato group.

In the practice of this invention it is usually preferred that the hydroxyl containing polymeric polyol has a molecular weight of from about 2000 to about 4000 and a corresponding hydroxyl number of from about 50 to about 25. The hydroxyl terminated polymeric polyols used in this invention are unsaturated polymers of the type prepared by polymerizing unsaturated monomers comprising from about 70 to about 100 percent conjugated dienes selected from the group consisting of 1,3-butadiene and isoprene and up to about 30 percent styrene with the aid of organic peroxy catalysts to provide polymers which are generally terminated at both ends of their chain with hydroxyl groups and have an hydroxyl functionality of from about 2 to about 3 and usually from about 2.1 to about 2.8. The preferred hydroxyl containing polymeric polyols are polybutadiene polyols, polyisoprene polyols, and butadiene-styrene copolymer polyols having about 80 to 90 percent units derived from butadiene and about 20 to 10 percent units derived from styrene.

The diphenyl methane diisocyanates used in this invention include the isomers and mixtures of isomers of diphenyl methane diisocyanate such as the 4,4'- and 2,4-isomers which are normally solid at temperatures above 15° C. and the so-called liquid diphenyl methane diisocyanates of the type treated with from about 0.1 to about 3 percent by weight of a trihydrocarbyl phosphate such as the trialkyl phosphates exemplary of which are triethyl, tripropyl, triisobutyl, and trihexyl phosphates and also triphenyl and tribenzyl phosphates having an isocyanate equivalent of from about 125 to about 200. The diisocyanate equivalent of the diisocyanate is determined by ASTM D1638–60–T modified by heating the test sample to reflux in dry toluene in the presence of dibutylamine and holding the mixture at reflux for 45 minutes before cooling and continuing with the test procedure.

Representative of the 2,6 dialkylated para cresols are para cresol 2,6 dialkylated with alkyl radicals having from 4 to 12 carbon atoms and preferably from 4 to 6 carbon atoms. Examples of such alkyl radicals are butyl, tertiary butyl, amyl, tertiary amyl, hexyl, tertiary hexyl, heptyl, tertiary heptyl, octyl, tertiary octyl, nonyl, tertiary nonyl, decyl, tertiary decyl, undecyl, tertiary undecyl, dodecyl and tertiary dodecyl radicals. A preferred dialkylated para cresol is 2,6-ditertiary butyl para cresol.

Various organic diamines can be used in this invention to cure the prepolymer. Examples of such diamines are diamines having primary amino groups representative of which are 4,4'-methylene-bis (2-chloroaniline), ortho dichloro benzidine, 4,4'-bis amino phenyl sulfone and dianisidine. The preferred diamine is 4,4'-methylene-bis (2-chloroaniline).

The polyurethanes of this invention are prepared by reacting in the presence of the 2,6 dialkylated para cresol the hydroxyl containing polymeric polyol, a diphenyl methane diisocyanate and the organic diamine. It is preferred that the polyurethanes are prepared from a polyurethane reaction mixture which comprises a prepolymer, the 2,6 dialkylated para cresol and an organic diamine curative.

The prepolymer is prepared by reacting the hydroxyl containing polymeric polyol with a diphenyl methane diisocyanate in the presence of the 2,6 dialkylated para cresol to provide a prepolymer having an isocyanate content of from about 2 to about 8 percent free isocyanate groups. It is the preferred practice of this invention to mix the 2,6 dialkylated para cresol with the hydroxyl containing polymeric polyol and heat the mixture to a temperature of from about 40° C. to about 100° C. to reduce the viscosity of the polymeric polyol and dissolve the substituted para cresol. A reduced pressure of less than about 760 millimeters of mercury can then be applied for a few minutes to remove possible traces of water which a commercial grade of the hydroxyl containing polymeric polyol may contain. The diphenyl methane diisocyanate is then mixed with the mixture and the reaction allowed to proceed for about 30 to about 60 minutes at a temperature of from about 50° C. to about 100° C. It is then usually preferred to dilute the prepared prepolymer with a solvent to provide a prepolymer solution having from about a 30 to about a 70 percent by weight solids content.

Immediately before use a solution of the diamine curative is mixed with the prepolymer solution to form the polyurethane reaction mixture. If desired, the curative solution can contain a portion of the substituted para cresol and also a catalyst or accelerator to promote the rate of curing of the polyurethane reaction mixture. Various catalysts or accelerators can be used and representative examples are shown in U.S. patent application having Ser. No. 393,779 filed Sept. 1, 1964 now U.S. Pat. No. 3,446,779. A preferred class of accelerators is the 2-mercaptothiazoles such as 2-mercaptobenzothiazole.

The polyurethane reaction mixture is then usually allowed to cure at a temperature of from about 25° C. to about 100° C. for about 1 to about 75 hours. If a catalyst or accelerator is used to promote the reaction of the polyurethane reaction mixture the curing temperature time can be reduced.

Various nonreactive solvents known to those skilled in the polyurethane art can be used for the preparation of the prepolymer solutions and polyurethane reaction mixtures. Representative examples of the solvents are aromatic solvents such as benzene, xylene and toluene; and the liquid lower ketones such as acetone, methyl ethyl ketone, methyl isobutyl ketone, and diisobutyl ketone. If the polyurethane reaction mixtures of this invention are to be used to prepare the cured polyurethanes in confined areas which are subject to explosive hazards, nonflammable chlorinated solvents can be used to form nonflammable prepolymer solutions and polyurethane reaction mixtures. Representative examples of such solvents are chloro-substituted olefins such as dichloroethylene, trichloroethylene, and 1,1,2,2-tetra-chloroethylene; and chloro-substituted saturated hydrocarbon compounds such as methyl chloroform, dichloromethane, 1,2-dichloroethane, trichloroethane, and 1,1,2,2-tetrachloroethane. Trichloroethylene is particularly useful. Mixtures of the solvents may be used to obtain satisfactory solubilities, rates of solution, spreading properties and evaporation rates, particularly when the polyurethane is to be used as a spray composition and applied to a suitable surface.

If desired, various pigments and leveling and reinforcing agents such as particulate carbon blacks and titanium dioxide can be added to the hydroxyl containing polymeric polyol, prepolymer or prepolymer solution. The preferred carbon blacks are oil furnace carbon blacks. When such a pigment or carbon black is added, it is usually added in an amount from about 0.5 to 50 parts and preferably, in the amount from about one to about twenty parts of pigment per hundred parts of prepolymer by weight. The carbon black usually has an average particle diameter of from about 15 to about 100 millimicrons and the titanium dioxide usually has a particle size of from about .2 to about 1.0 micron.

The following examples further illustrate the invention and are not intended to be limiting. The parts and percentages are by weight unless otherwise indicated.

EXAMPLE I

A polyurethane prepolymer was prepared by the following method: To a suitable reactor was charged 750 parts of an hydroxyl containing polybutadiene polyol having a molecular weight of about 3000 and an hydroxyl number of about 42 and 22 parts of 2,6-ditertiary butyl para cresol. The mixture was heated to about 43° C. and a reduced pressure of less than 760 millimeters of mercury was applied to remove trace amounts of water. The reduced pressure was removed and the temperature of the mixture increased to about 54° C. With stirring, 273 parts of diphenyl methane diisocyanate was added to the mixture. The reaction was allowed to proceed for 90 minutes. The maximum temperature of the reaction was about 82° C. A reduced pressure of about 15 millimeters of mercury was applied for about 30 minutes. The prepolymer product had a 6 percent free isocyanate content.

To 300 parts of the prepolymer, after cooling to about 25° C., was mixed 300 parts of a solvent consisting of 150 parts of toluene and 150 parts of methyl ethyl ketone to form a prepolymer solution.

To 50 parts of the prepolymer solution was added a curative mixture which consisted of a solution of 3.8 parts of 4,4'-methylene bis-(2-chloroaniline), 0.5 part of 2,6-ditertiary butyl para cresol, 0.5 part of 2-mercaptobenzothiazole, and 10 parts of methyl ethyl ketone to form a polyurethane reaction mixture.

A film of the polyurethane reaction mixture was immediately cast on a polyethylene surface and allowed to cure for about 72 hours at about 25° C. A strip of the cured polyurethane having a thickness of about 0.02 inch was immersed in 85 percent phosphoric acid at 70° C. for 11 days. As is shown by Table 1, the strip underwent only a negligible weight change and had good tensile strength retention.

TABLE 1

|  | Original strip | After 11 days in 85% $H_3PO_4$ at 70° C. |
|---|---|---|
| Tensile strength (p.s.i.)[1] | 2,400 | 2,300 |
| Elongation (percent) | 210 | 200 |
| Weight of strip (grams) | 1.11 | 1.09 |
| Percent weight change | | Negligible |

[1] Pounds per square inch.

The percent free isocyanate content of the prepolymer is defined as $$\frac{\text{grams free isocyanato (NCO) groups} \times 100}{100 \text{ grams of prepolymer.}}$$

The percent free isocyanate content of the prepolymer can be determined by the following method:

A weighed amount of prepolymer (about 10 to 30 grams) is treated with about 20 milliliters (mls.) of dry toluene and 20 milliliters of a 2 normal dibutylamine prepared in dry toluene by heating the mixture slowly to its boiling point (about 10 minutes) followed by cooling to about 25° C. for about one hour. Fifty milliliters of methanol is added and the excess dibutylamine titrated with 1 normal hydrochloric acid using Bromophenol-Blue as an indicator. The percent free isocyanate content (percent NCO) of the prepolymer is $$\% \text{ NCO} = \frac{(\text{mls.blank} - \text{mls.prepolymer}) (0.402) (\text{Acid Normality}) (100)}{\text{grams of prepolymer.}}$$

EXAMPLE II

A prepolymer solution was prepared according to the method of Example I and 75 parts of oil furnace carbon black (obtained as Raven 30 from The Columbian Carbon Company) was added to the prepolymer solution.

To 50 parts of the prepolymer solution was then added a curative mixture which consisted of a solution of 3.5 parts of 4,4'-methylene-bis-(2-chloroaniline), 0.5 part of 2,6-ditertiary butyl para cresol, 0.5 part of 2-mercaptobenzothiazole and 30 parts of methyl ethyl ketone to form a polyurethane reaction mixture.

A film of the polyurethane reaction mixture was immediately cast on a polyethylene surface and allowed to cure for about 72 hours at about 25° C. A strip of the cured polyurethane having a thickness of about 0.18 inch was immersed in an 85 percent phosphoric acid at 70° C. for 30 days. As is shown in Table 2 the strip of cured polyurethane underwent no weight increase.

TABLE 2

|  | Original strip | After 30 days in 85% H₃PO₄ at 70° C. |
|---|---|---|
| Tensile strength (p.s.i.) | 1,400 | 700 |
| Elongation (percent) | 100 | 40 |
| Weight of strip (grams) | 0.59 | 0.59 |
| Percent weight increase | | 0 |

EXAMPLE III

To 50 parts of the prepolymer solution of Example I was added to a curative mixture which consisted of a solution of 4.3 parts of o-dichlorobenzidine, 0.5 part 2-mercaptobenzothiazole, 0.5 part 2,6-ditertiary butyl para cresol and 10 parts methyl ethyl ketone to form a polyurethane reaction mixture.

A film of the polyurethane reaction mixture was immediately cast on a polyethylene surface and allowed to cure for about 72 hours at about 25° C. A strip of the cured polyurethane having a thickness of about 0.021 inch was immersed in an 85 percent phosphoric acid at 70° C. for 11 days. As is shown in Table 3 the strip underwent a 4 percent weight increase which is considered to be a satisfactory result for applications where such a polyurethane will be exposed to phosphoric acid such as a storage container.

TABLE 3

|  | Original strip | After 11 days in 85% H₃PO₄ at 70° C. |
|---|---|---|
| Tensile strength (p.s.i.) | 2,100 | 1,200 |
| Elongation (percent) | 170 | 130 |
| Weight of strip (grams) | 1.16 | 1.20 |
| Percent weight increase | | 4 |

EXAMPLE IV

A polyurethane reaction mixture was prepared according to the method of Example III except that four parts of o-dianisidine was substituted for the o-dichlorobenzidine and 15 parts of methyl ethyl ketone was added instead of 10 parts.

A film of the polyurethane reaction mixture was immediately cast on a polyethylene surface and allowed to cure for 72 hours at about 25° C. A strip of the cured polyurethane was immersed in an 85% phosphoric acid at 70° C. for 11 days. As shown by Table 4 the strip underwent a negligible weight change.

TABLE 4

|  | Original strip | After 11 days in 85% H₃PO₄ at 70° C. |
|---|---|---|
| Tensile strength (p.s.i.) | 3,000 | 2,800 |
| Elongation (percent) | 230 | 240 |
| Weight of strip (grams) | 0.78 | 0.75 |
| Percent weight increase | | Negligible |

EXAMPLE V

A prepolymer solution was prepared according to the method of Example I and 15 parts of oil furnace carbon black was added to the prepolymer solution.

To 50 parts of the prepolymer solution was added a curative mixture which consisted of a solution of 4.8 parts 4,4'-methylene-bis-chloroaniline, 0.5 part 2-mercaptobenzothiazole, 0.5 part 2,6-ditertiary butyl para cresol and 10 parts methyl ethyl ketone to form the polyurethane reaction mixture.

A film of the polyurethane reaction mixture was immediately cast on the polyethylene surface and allowed to cure for about 72 hours at about 25° C. Strips of the cured polyurethane having a thickness of about 0.02 inch were immersed in solutions of 85% phosphoric acid. Solution A was at room temperature. Solution B at 70° C. and Solution C at 82° C. As shown by Table 5, in each of the acid solutions the strips underwent no weight change.

TABLE 5

|  | Solution A | Solution B | Solution C |
|---|---|---|---|
| Days | 28 | 28 | 18 |
| Initial weight (grams) | 1.00 | 1.00 | 1.10 |
| Final weight (grams) | 1.00 | 1.00 | 1.10 |
| Percent weight increase | None | None | None |
| Original tensile (p.s.i.) | 2,600 | | |
| Original elongation (percent) | 240 | | |
| After treatment tensile (p.s.i.) | 2,600 | 2,000 | 1,500 |
| After treatment elongation (percent) | 230 | 160 | 140 |

EXAMPLE VI

A prepolymer was made by the method of Example I from 1000 parts of the hydroxy terminated polybutadiene polyol, 30 parts of the 2,6-ditertiary butyl para cresol and 410 parts of a liquid diphenyl methane diisocyanate having an average molecular weight of 288. A prepolymer solution was formed by mixing 300 parts of the prepolymer with a solvent consisting of 150 parts of toluene and 150 parts of methyl ethyl ketone. The prepolymer solution having a three percent free isocyanate group content. was mixed with 40 parts of particulate titanium dioxide and ball milled for 24 hours. The white colored prepolymer in the solvent was analyzed to have a 2.6 percent free isocyanate content.

To 200 parts of the prepolymer solution was added a curative mixture which consisted of a solution of 15.7 parts 4,4'-methylene-bis-(2-chloroaniline), 2.0 parts of 2,6-ditertiary butyl para cresol, 0.1 part 2-mercaptobenzothiazole and 60 parts of methyl ethyl ketone to form the polyurethane reaction mixture.

A film of the polyurethane reaction mixture was immediately cast on a polyurethane surface and cured for about 72 hours at about 25° C. Strips of the cured polyurethane having a thickness of 0.02 inch were immersed in a 54 percent phosphoric acid at 70° C. and at 82° C. for 30 days. As shown by Table 6 the strips underwent only a very small weight percent increase.

TABLE 6

|  | Original strip | After 30 days in— | |
|---|---|---|---|
|  |  | 54% H₃PO₄ at 70° C. | 54% H₃PO₄ at 82° C. |
| Sample weight (grams) | 1.25 | 1.30 | |
|  | 1.36 | | 1.39 |
| Percent weight increase | | 4 | 2 |
| Tensile strength (p.s.i.) | 2,300 | 2,000 | 1,800 |
| Elongation (percent) | 130 | 80 | 80 |

EXAMPLE VII

A 15,000 gallon capacity railroad metal tank car to be used for transporting fertilizer 54 percent phosphoric acid was lined with a polyurethane composition of this invention in the following manner:

The inner surface of the metal tank car was prepared by shot blasting followed by spray coating with a primer solution. The primer solution comprised an adhesive mixture of resins of the thermosetting class comprising polyvinyl butyral resin and the phenolic type in a solvent mixture comprising isopropanol and toluene (obtained from The Conap Company as Conap-1146-C primer). The primer was allowed to dry for about 12 hours at about 25° C.

Multiple spray coats of a polyurethane reaction mixture were spray coated onto the prepared inner surface of the tank car and allowed to cure at about 25° C. to form a built-up protective inner liner in the tank car having a thickness of at least about 0.05 inch. Samples of the sprayable polyurethane reaction mixture were cast onto a polyethylene surface and cured for about 72 hours at about 25° C. to form strips having a thickness of 0.05 inch which were immersed in 54 percent phosphoric acid solutions at 70° C. and at 82° C. for 25 days. As shown by Table 7 the strips underwent no weight change.

TABLE 7

| | Original strip | After 25 days in— | |
|---|---|---|---|
| | | 54% H₃PO₄ at 70° C. | 54% H₃PO₄ at 82° C. |
| Sample weight (grams) | 2.33 / 2.37 | 2.33 | 2.37 |
| Percent weight change | | None | None |
| Tensile (p.s.i.) | 2,100 | 2,800 | 2,400 |
| Elongation (percent) | 135 | 130 | 100 |

The polyurethane reaction mixture used for lining the tank car was prepared by the following method:

To a suitable reactor was charged 34.7 parts of a mixture consisting of 80 percent by weight of the hydroxyl containing polybutadiene polyol used in Example I and 20 percent by weight of the oil furnace black and 71.3 additional parts of the hydroxyl containing polybutadiene polyol.

To the polyol-carbon black mixture was added 2.9 parts of 2,6-ditertiary butyl para cresol and the resulting mixture heated to about 50° C. and stirred for about 40 minutes.

Then 41.1 parts of a liquid diphenyl methane diisocyanate having a molecular weight of about 288 was added to the heated mixture and the reaction exotherm caused the temperature to increase to about 60 to 65° C. over a period of 50–60 minutes. This was followed by the addition of 75 parts of toluene and 75 parts of methyl ethyl ketone to form a prepolymer solution having a 2.85 percent free isocyanate content.

A sprayable polyurethane reaction mixture was formed by mixing with 9080 parts of prepolymer solution at about 25° C. 2190 parts of a curative solution which consisted of

| | Parts |
|---|---|
| 4,4'-methylene bis (2-chloroaniline) | 51.0 |
| 2,6-ditertiary butyl para cresol | 3.0 |
| 2-mercaptobenzothiazole | 0.3 |
| Methyl ethyl ketone | 90.0 |
| | 144.3 |

The polyurethane compositions of this invention are generally characterized by having less than about a 10 percent weight increase when exposed to a 54 percent phosphoric acid at 82° C. for about 28 days and by having less than about a 10 percent weight increase when exposed to an 84 percent phosphoric acid at 70° C. for 28 days. Thus they are useful for applications which require exposure to phosphoric acid for extended periods of time. It is understood that the polyurethanes referred to in this specification may also contain polyurea linkages.

Where polyurethane compositions are used as structures, to contain phosphoric acid, it is desired that the polyurethanes do not increase in weight by more than about 10 percent when immersed in the phosphoric acid at a temperature of about 70° C. for about 28 days. It is generally considered that polyurethanes exceeding a 10 percent weight increase under these conditions are unsuitable for the normal storage of phosphoric acid because of their tendency to allow the acid to seep through the polyurethane barrier, thereby causing a loss of the acid and damage to surrounding structures.

Sprayable liquid polyurethane reaction mixtures can be prepared by the method of this invention which are useful for preparing seamless protective innerliners for storage containers such as containers used for storing phosphoric acid. Nonflammable sprayable solutions of the polyurethane reaction mixtures prepared with the chlorinated solvents can be used to coat surfaces of materials in confined areas such as the inner surfaces of storage containers without incurring explosive hazardous conditions. Such surfaces can be of metal, cement, wood, plastics, and other materials to support the coats of polyurethane. When used as protective innerliners for storage containers for phosphoric acid the layers of the polyurethane composition should have a thickness of at least about 3 and preferably of from about 5 to about 100 mils.

Generally the interior surface of a storage tank is cleaned with a suitable solvent such as an aliphatic or aromatic hydrocarbon or with an inorganic acid or base, by steam, by shot or sand-blasting, or a combination of these methods before the polyurethane reaction mixture solution is applied. It is usually desired to apply the solution by spray coating. If desired, a bonding cement can be applied to the surface of the container in order to enhance the bonding the polyurethane composition to the inner surface of the container. It is usually preferred to mix carbon blacks or titanium dioxide with the polyurethane reaction mixture to enhance its thixotropic properties and to provide a cured polyurethane innerliner relatively free of pinholes.

It should be pointed out that the preferred composition of this invention, as particularly practiced in the examples, is preferable for use in the preparation of storage containers for phosphoric acid which requires first forming a prepolymer by reacting the polymeric polyol with a diphenyl methane diisocyanate in the presence of the 2,6-dialkylated paracresol and then curing said prepolymer by reacting with an organic diamine.

In this specification the term free isocyanato groups refer to NCO units in the prepolymer of polyurethane reaction mixture that are free for reaction with compounds having reactive hydrogens.

While certain representative embodiments and details have been shown for the purpose of illustrating the invention, it will be apparent to those skilled in the art that various changes and modifications may be made therein without departing from the spirit or scope of the invention.

What is claimed is:

1. A polyurethane composition characterized by having less than about a 10 percent weight increase when immersed in a 54 percent phosphoric acid at 70° C. for 28 days where the said composition is prepared by the method which comprises forming a prepolymer by reacting in the presence of from about 1 to about 5 parts by weight of a 2,6-dialkylated para cresol having the formula:

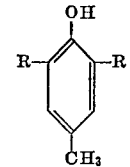

where R is an alkyl having from 4 to 12 carbon atoms,
   (a) 100 parts by weight of a hydroxyl containing unsaturated polymeric polyol having a molecular weight of from about 1000 to about 5000, a corresponding hydroxyl number of from about 110 to about 20 and a hydroxyl functionality of from about 2.1 to about 2.8 and where the polymeric polyol comprises from about 70 to about 10 percent units derived from conjugated dienes selected from the group consisting of 1,3-butadiene and isoprene and up to about 30 percent units derived from styrene, and a
   (b) liquid diphenyl methane diisocyanate having an isocyanate equivalent in the range of about 125 to about 200 in an amount which would form a prepolymer of the polymeric polyol-diisocyanate having from about 2 to about 8 percent free isocyanate content and curing said prepolymer by reacting with an organic diamine having primary amino groups in an amount of from about 0.5 to about 1.0 amino groups for each free isocyanato group.

2. The polyurethane composition of claim 1 prepared by
   (a) mixing the 2,6 dialkylated para cresol with the polymeric polyol at a temperature of from about 40° C. to about 100° C. and sufficient to melt the said polyol,
   (b) reacting a diisocyanate selected from diphenyl methane 4,4'-diisocyanate and diphenyl methane, 2,4-diisocyanate with the mixture to form a prepolymer,
   (c) dissolving the prepolymer in a nonreactive solvent to form a sprayable prepolymer solution, and
   (d) curing the prepolymer by mixing with the prepolymer solution at a temperature of from about 25° C. to about 100° C. a solution in nonreactive solvent of the diamine having primary amino groups.

3. The polyurethane composition of claim 2 where the hydroxyl containing polymeric polyol has a molecular weight of from about 2000 to about 4000, a hydroxyl functionality of from about 2.1 to about 2.8 and is selected from the group consisting of polybutadiene polyols and polyisoprene polyols, the organic diamine is selected from the group consisting of 4,4'-methylene bis (2-chloroaniline), ortho dichloro benzidine, 4,4'-bis amino phenyl sulfone and dianisidine, and where the R alkyl radicals of the 2,6 ditertiary para cresol are alkyl radicals having from 4 to 6 carbon atoms.

4. The polyurethane composition of claim 3 where the 2,6 dialkylated para cresol is 2,6 ditertiary butyl para cresol.

5. The polyurethane composition of claim 4 where the prepolymer solution contains from about 0.5 to about 50 parts by weight per 100 parts by weight of prepolymer of at least one pigment selected from the group consisting of carbon blacks having an average particle diameter of from about 15 to about 100 millimicrons and titanium dioxide having a particle size of from about 0.2 to about 1.0 micron is mixed.

6. The polyurethane composition according to claim 1 where the alkyl radicals of the 2,6 dialkylated para cresol have 4 to 6 carbon atoms and the said hydroxyl containing polymeric polyol is a polybutadiene polyol having a molecular weight of about 2000 to about 4000 prepared by polymerizing 1,3 butadiene with the aid of an organic peroxy catalyst.

7. A method of preparing the polyurethane composition of claim 1 which comprises:
   (a) preparing a prepolymer having a free isocyanate content of from about 2 to about 8 percent by reacting in the presence of from about 1 to about 5 parts by weight of a 2,6 dialkylated para cresol having the formula:

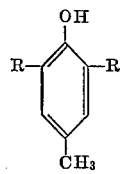

where R is an alkyl radical having from 4 to 12 carbon atoms;

(1) 100 parts by weight of a hydroxyl containing polymeric polyol having a molecular weight of from about 1000 to about 5000, a corresponding hydroxyl number of from about 110 to about 20 and a hydroxyl functionality of from about 2 to about 3 and where the polymeric polyol comprises from about 70 to about 100 percent units derived from conjugated dienes selected from the group consisting of 1,3-butadiene and isoprene and up to about 30 percent units derived from styrene, and
   (2) a diphenyl methane diisocyanate, and
   (b) curing the said prepolymer by reacting the prepolymer with an organic diamine having primary amine groups in an amount of from about 0.5 to about 1.0 amino groups for each free isocyanate group.

8. A storage container of the polyurethane composition of claim 1 suitable for storing phosphoric acid having a protective innerliner of a thickness of from about 3 to about 100 mils where the said protective innerliner is the said polyurethane composition prepared by the method required by claim 1.

9. A method of preparing the storage container of claim 8 which comprises applying at least one spray coat of a polyurethane reaction mixture to the interior surface of the said container and curing the spray coats of polyurethane mixture to form the innerliner, where the polyurethane reaction mixture is prepared by:
   (a) mixing the 2,6 dialkylated para cresol with the polymeric polyol,
   (b) reacting a diphenyl methane diisocyanate with the mixture to form a prepolymer,
   (c) dissolving the prepolymer in a nonreactive solvent to form a prepolymer solution, and
   (d) curing the prepolymer by mixing with the prepolymer solution at a temperature of from about 25° C. to about 100° C. a solution in a nonreactive solvent of the diamine having primary amino groups.

References Cited
UNITED STATES PATENTS

| | | | |
|---|---|---|---|
| 3,072,605 | 1/1963 | Rogers et al. | 260—45.95 |
| 3,446,779 | 5/1969 | Finelli | 260—45.8 N |
| 3,449,256 | 6/1969 | Farrissey et al. | 260—77.5 AT |

OTHER REFERENCES

Saunders et al., Polyurethanes, Part II, Interscience, New York, 1964, pp. 344 and 570.
Verdol et al., Rubber Age, July 1966.

DONALD E. CZAJA, Primary Examiner

W. J. WELSH, Assistant Examiner

U.S. Cl. X.R.

117—104 R, 161 KP; 260—77.5 AT, 77.5 CR, 77.5 SS, 45.95